Figure 1:
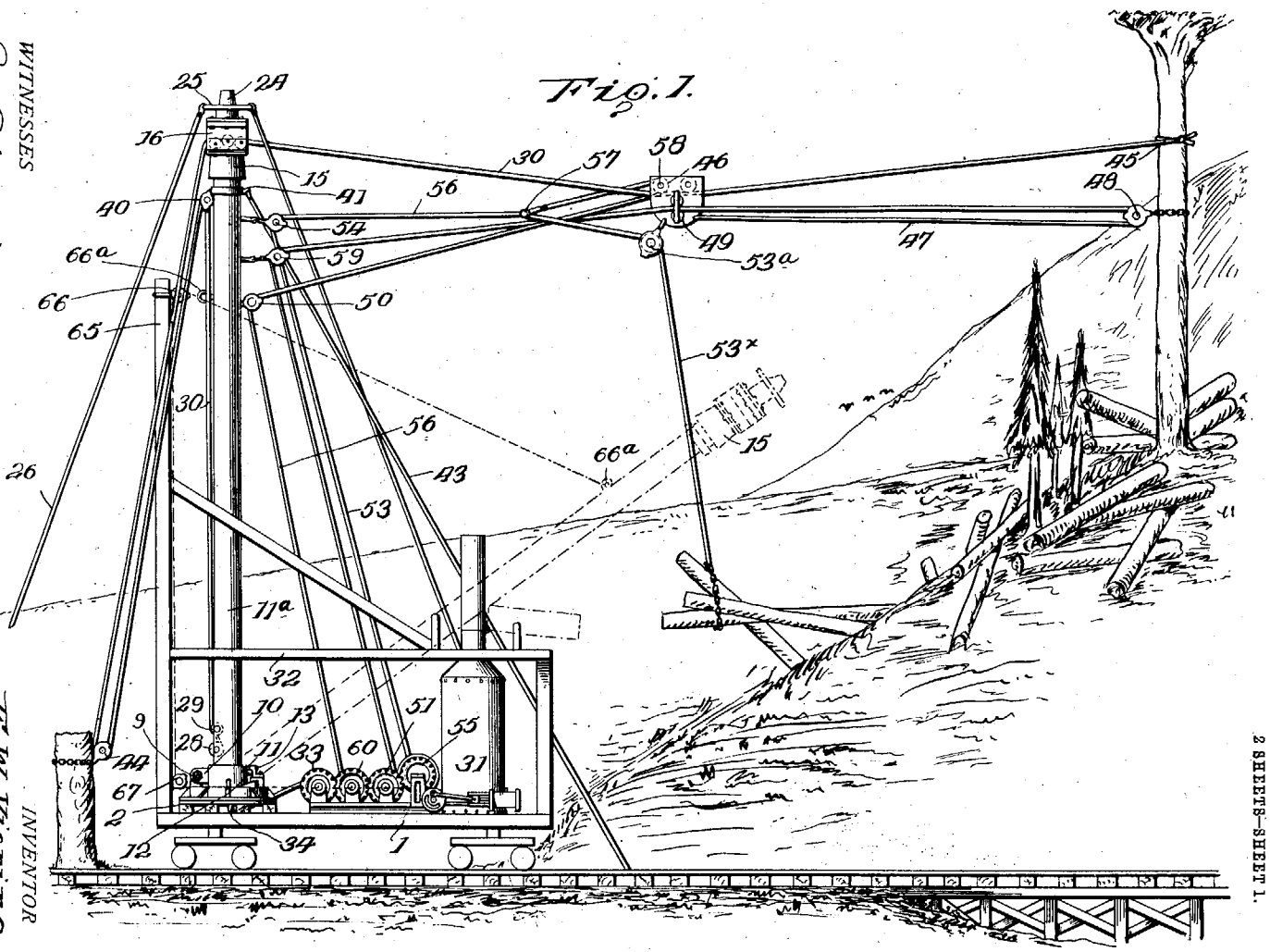

F. W. VIERING.

APPARATUS FOR TRANSPORTING LOGS.

APPLICATION FILED OCT. 16, 1912.

Reissued June 24, 1913.

13,585.

2 SHEETS—SHEET 1.

WITNESSES

K. Abramson.

Floyd R. Comwall.

INVENTOR

F. W. Viering.

By John Quinn

Attorney

COLUMBIA PLANOGRAPH CO., WASHINGTON, D. C.

F. W. VIERING.

APPARATUS FOR TRANSPORTING LOGS.

APPLICATION FILED OCT. 16, 1912.

Reissued June 24, 1913.

13,585.

2 SHEETS—SHEET 2.

WITNESSES

R. Abramson.

Floyd R. Comwall.

INVENTOR

F. W. Viering.

Attorney

COLUMBIA PLANOGRAPH CO., WASHINGTON, D. C.

UNITED STATES PATENT OFFICE.

FREDERICK W. VIERING, OF DAVIS, WEST VIRGINIA.

APPARATUS FOR TRANSPORTING LOGS.

13,585. Specification of Reissued Letters Patent. Reissued June 24, 1913.

Original No. 1,015,103, dated January 16, 1912, Serial No. 648,706. Application for reissue filed October 16, 1912. Serial No. 726,163.

*To all whom it may concern:*

Be it known that I, FREDERICK W. VIERING, citizen of the United States, residing at Davis, in the county of Tucker and State of West Virginia, have invented certain new and useful Improvements in Apparatus for Transporting Logs; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

This invention relates to improvements in an apparatus for transporting logs.

In logging in rough mountainous country, considerable difficulty is experienced in transporting the logs from where they are felled to a convenient point where they can be shipped to the mill. In fact, a great amount of timber cannot be secured, for even though it may be cut down, no practical or economical means have heretofore been devised for transporting the logs to a railroad or saw mill. The difficulties in providing an apparatus which could be utilized and used is due principally to the fact that because of the necessity of constant moving about to gather the logs in the rough country, the expense is so great as to make it commercially and practically unprofitable.

According to my invention, I provide portable means for transporting the apparatus, and so arrange the operating mechanism that once the apparatus is set up, a wide range of territory can be cleared in a short period of time, the parts being so arranged that the cables can be connected and disconnected to change the path of travel of the logs, at short notice and little or no loss of time.

To this end my invention aims to provide means which will permit of the apparatus being quickly and conveniently set up for operation, and which will also provide economical and advantageous mechanism for carrying timber from the point of felling to a convenient point where it may be transferred or worked.

The invention also comprehends improvements in the specific details of construction and arrangement of parts, which will be hereinafter described and particularly pointed out in the claims.

Figure 2:
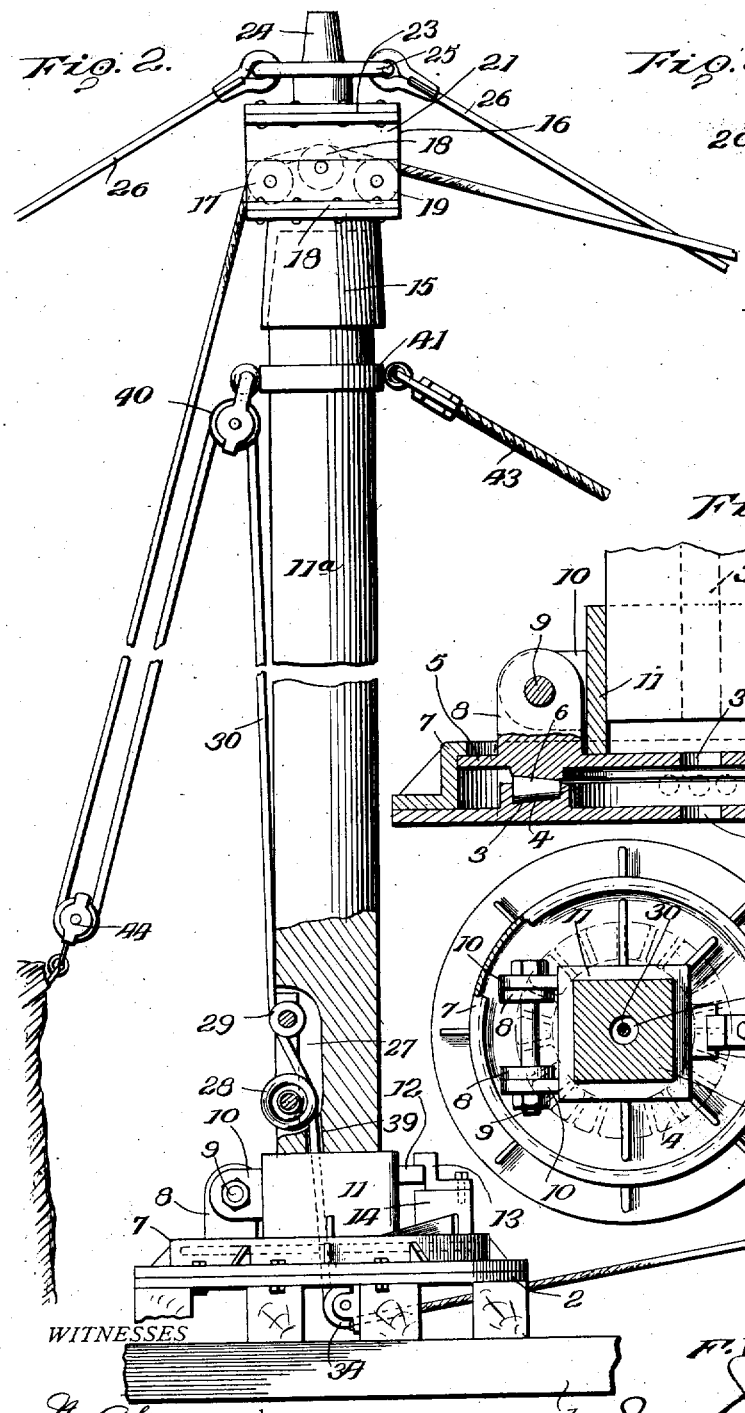
Figure 5:
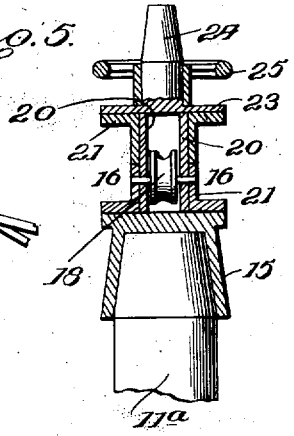
Figure 3:
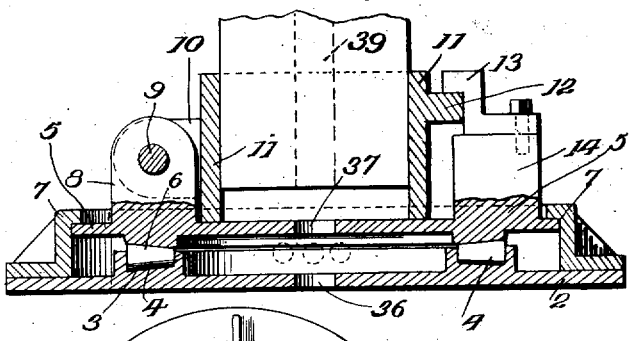
Figure 4:
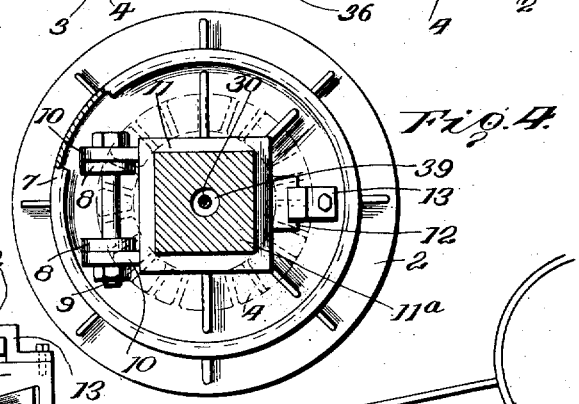

In the drawings, Figure 1 is a side elevation of my improved apparatus. Fig. 2 is a side elevation of the mast. Fig. 3 is an enlarged detail vertical section of the lower end of the mast, and its support. Fig. 4 is a detail horizontal section of the same. Fig. 5 is a detail enlarged section of the upper end of the mast.

1 indicates a car with which my improvement is preferably associated, although it is to be distinctly understood that a car is not absolutely essential in carrying out the invention.

Mounted on the car is a base 2, provided with an annular track 3, supporting a plurality of anti-friction rollers 4. Fitting over the base 2, is a plate 5, provided on its underside with a track 6, with which the anti-friction rollers 4, engage. The plate 5, is held in relative position with the base 2, by an overhanging annular flange plate 7, the inner lip of which fits over the outer edge of said plate, as clearly shown in the drawings. Extending upwardly from the plate 5, are two ears 8—8, which are pivoted at 9—9, to two outwardly projecting ears 10—10, on a base collar 11, secured to the bottom of a mast or spar $11^a$. Projecting from the opposite side of the base collar 11, is a lug 12, which is engaged by a detachable overhanging flange 13, bolted to a lug 14, extending up from the plate 5. The mast or spar $11^a$ is rigidly secured in the base collar 11, and extends upwardly therefrom. The upper end of the mast $11^a$ receives a fixed cap 15 and riveted or otherwise secured thereto are two spaced apart side members 16—16, forming a housing for a series of pulleys 17, 18 and 19. The middle pulley 18, is slightly higher than the pulleys 17 and 19, to cause the cable to more readily track in the grooves and to equalize the strain. Each member 16, comprises a side plate 20, and two angle irons 21, bolted to said plates to provide a substantial and rigid structure. Fitting on the upper surface of the two members 16, 16 is a plate 23, provided with a trunnion 24, on which is loosely mounted a flanged collar 25 for receiving the guy ropes 26. This construction provides a convenient and efficient swivel connection at the top of the mast, whereby the latter may turn to accommodate itself to the position of the main cable, when hauling timber. Near the bottom the mast is formed with a slot 27, in which are mounted two pulleys 28 and 29, over which passes a main cable 30.

Located on the car is a hoisting engine 31, of any convenient type, and surrounding said hoisting engine is a suitable frame 32.

The mast is raised in a vertical position as shown in Fig. 1, and the main cable is unwound from the main drum 33. The main cable passes around a guide pulley 34 located under the base 2, and extends up through an opening 36, in the latter, and also through an opening 37, in the plate 5, and an opening 39 in the bottom of the mast, said latter opening communicating with the slot 27. The main cable now passes over the rear of pulley 28, and thence over the front of pulley 29 and up the outside of the mast and around a pulley 40, swiveled to a ring 41, on said mast. The ring 41 is braced as by a guy cable 43, shown in Fig. 2. The main cable, after passing around the pulley 40 is passed around a pulley 44, swiveled to a tree stump, or other convenient stationary support located adjacent the end of the car. The cable then passes over the pulleys 17, 18 and 19, and its end is securely fastened to a post or other support 45 at a point remote from the car and in line with the logs to be transported to the car. The main cable supports a carriage 46, having guide rollers which travel on said cable. The rear of the carriage is fastened to one end of a receding cable 47, which passes over a pulley 48 swiveled to the tree adjacent the cable support 45 and then passes between two guide rollers 49 on the side of the carriage, and then over a pulley 59 swiveled on the mast, and thence to one of the drums 51, of the hoisting engine.

56 indicates a slack pulling cable, one end of which is wound on a drum 60, and extends therefrom up and over a pulley 50, swiveled to the mast, and thence passes around a guide pulley 58, on the carriage 46. From the pulley 58, the slack pulling cable extends in the direction of the mast where it passes around a pulley 54, swiveled near the top of the mast, and it then extends in a downward direction to a drum 55, on the car. Between the guide pulley 58, and the swiveled pulley 54, a hoisting rope $53^{x}$ is swiveled to the slack pulling rope 56, as indicated at 57. The hoisting rope extends from the swivel 57, in the direction of the carriage, and to the latter is swiveled a pulley $53^{a}$, over which said cable passes. To the lower end of the hoisting cable are fastened chains or other means for engaging the logs to be transported.

In operation, the car is moved to the desired location, and the mast is raised to a vertical position, and the latch 13 is engaged over the flange 12. The guys 26, are spread out and their lower ends are rigidly anchored to adjoining tree stumps, or are otherwise secured. The mast having been previously positioned, and the car wheels chucked, the swiveled pulley 44, is anchored at a point some distance from the car, then pulley 48, is positioned. The receding cable is light and its end is passed over the pulley 48, and is directed to one of the drums on the car. The free end of the main cable is now attached to the receding cable, and by operating the drum the main cable is drawn out to the support. The drum winding the receding cable is stopped, and the main cable is anchored as at 45. During the time of pulling the main cable, it is slack, the carriage resting on the ground and ready to be elevated when necessary. The free end of the receding cable is run off the drum and is fastened to the rear of the carriage, the hoisting cable is attached to the slack cable and the drum 33 is operated, and the main cable is drawn taut, thereby elevating the carriage and positioning it for operation. The apparatus is now ready for operation. To move the carriage to a convenient point above the logs, the drum 51, is operated to wind the receding cable which pulls the carriage on the main cable, away from the mast, the drums carrying the hauling cable, in the mean time, being free, so as to permit of the hauling cable being drawn out with the carriage. After the carriage is positioned over the logs, drum 55 is freed and drum 60 is rotated, and the hoisting cable and its chains will lower so that the operators can secure the logs. The logs having been secured to the hoisting cable, drum 55 is rotated, and drum 51, is freed, consequently the hoisting cable $53^{x}$, and its load of logs are drawn up to the carriage. The drum 60 is freed, and drum 55 is rotated to wind the hauling cable $53^{x}$, which obviously draws the load of logs up to the carriage. Now by freeing drum 51, and continuing to revolve drum 55, the logs can be drawn up to the car, and then by freeing drum 55, and revolving drum 60, the logs can be lowered, and in position to be released. If all the logs in range of any setting of the main cable have been transported, it is necessary to shift said main cable. To quickly and conveniently accomplish this result, the receiving cable is slackened, and pulley 48, is moved to another tree, then the outer end of the main cable is released from its support and temporarily connected in any suitable manner with the receding cable, and the latter is operated to move said main cable to the same tree or support to which the pulley 48 is attached. This is quite important in the operation of my apparatus, for it must be borne in mind that the main cable must be quite large and is necessarily quite heavy, and it would be a practical impossibility to move it manually.

The apparatus is capable of transporting logs in a wide range, once the car is located, for to change the alinement of the cable, it is only necessary to change the position of the main cable and the receding cable, the construction of the mast and its support being such that the mast will readily accommodate itself to the positions of the cables.

It is highly important in an apparatus of this class that the mast be braced in opposition to the strain due to the load on the cable track. In the apparatus shown and described I provide the pulley 44, for the main cable, so that when the drum 33, is operated to tighten the cable, the mast is braced on opposite sides, consequently the weight of the logs when drawn up to the carriage only serves to increase the pull on the main cable on the opposite side of the mast, hence the portion of the cable between pulleys 40 and 44, acts to pull the mast in the opposite direction to that of the pull occasioned by the weight of the log. In other words, this arrangement of parts acts to equalize the bracing effect on opposite sides of the mast. This construction also serves to exert a vertical downward pressure on the mast, hence the greater the weight on the main cable, the greater will be the central thrust on the mast, consequently the mast is practically in a rigid condition.

To transport the apparatus, the guy wires 26, are removed and the flange 13, is also removed, and the mast is rocked on the pivots 9—9, as shown in dotted lines in Fig. 1.

For convenience in elevating the mast, I provide a standard 65, on the end of the car, and secure thereto a pulley 66. One of the cables is passed over a guide pulley 67, thence over the pulley 66, and is attached to a ring 66[a], secured on the mast. By operating the drum the mast may be raised to its vertical position.

What I claim is:—

1. In combination, a mast formed with an opening in its bottom which communicates with an open slot, a rotatable base for supporting the mast, said base having an opening which communicates with the opening in the lower end of the mast, a pulley located below the base to guide a cable through the openings, a pulley secured on the mast above the slot therein, a second pulley mounted on the mast above the first mentioned pulley, a cap on top of the mast, a support remote from the mast, a pulley mounted on the support, a cable passing through the opening and open slot and around the pulleys, a guy cable holder mounted on the cap, and means connected to the guy holder for bracing the mast.

2. In combination, a stationary support, a rotating base mounted on the stationary support, means for guiding the rotating base on the support, a mast hinged to the rotating base, means for holding the mast in locked vertical position on the rotating base, a cable guide under the support, said mast having an opening in its lower end, a pulley in the opening, a cap on the mast, a pulley mounted in the cap, a cable passing over the guide and the pulley, means for controlling the cable, and a guy cable holder forming a bearing for the upper end of the mast, and guys extending from the guy cable holder to brace the mast.

3. In combination, a car, a hoisting engine including a series of drums, a stationary base mounted on the car, said base having an opening, a revolving plate located above the stationary plate, said plate having an opening, a flange on the base for guiding and holding the plate in position, anti-friction rollers between the plate and the base, a base collar hinged to the plate, a detachable latch for securing the base collar in locked position, pulleys on the mast near the bottom of the latter, a swiveled pulley near the top of the mast, a swiveled pulley mounted remote from the car, a cap on top of the mast, a series of rollers in the cap, a stationary support remote from the car, a cable passing from one of the drums through the openings and over the aforesaid pulleys, guy ropes for the mast, a carriage mounted on the cable, and cables coöperating with the other drums of the hoisting engine and the carriage to lift and transport logs.

4. In combination, a mast formed with an opening, a base collar secured to said mast, a plate on which the base collar is hinged, means for locking the base collar and mast in vertical position, a base on which the plate revolves, said base having a flange to hold and guide the plate in position, a cap on the top of the mast, guide rollers mounted in the cap, a trunnion projecting from the cap, a guy holder loosely mounted on the trunnion, and means secured to the guy holder for bracing the mast.

5. In combination, a base formed with an opening, a plate mounted above the base and formed with an opening, anti-friction rollers between the base and the plate, a mast hinged to the plate, a locking device for holding the mast in vertical position, a cap on top of the mast, said cap comprising two spaced apart members, and a trunnion, pulleys mounted between the two spaced apart members, one of said pulleys being higher than others, a guy cable support loosely mounted on the trunnion, and pulleys on the mast to guide a cable to the pulleys in the cap.

6. In combination, a mast formed with an opening in its bottom which communicates with an open slot, a rotatable base for supporting the mast, said base comprising a lower stationary member formed with an opening and an upper rotating member formed with an opening, a pivotal connection between the mast and the rotating member, locking means for holding the mast in vertical position on the rotating member, the opening in the stationary and rotating members of the base and the opening in the mast communicating, a pulley under the base to guide a cable through said openings, a pulley secured on the mast above the slot therein, a cap secured on top of the mast, a guy cable holder on top of the housing, and means for bracing the mast.

7. The combination of a mast, a rotatable support for the mast, a cap fitted on the upper end of the mast, two spaced apart plates on the cap, two angle irons fitting against and secured to each of said plates, a horizontal plate having a vertical trunnion secured to the top of the angle irons, a guy cable support loosely mounted on the trunnion and a pulley mounted between the plates.

8. In combination a car, a hoisting engine including drums, a rotatable base mounted on the car, said base having openings, a mast hinged to the rotating base, means for locking the mast in vertical position, said mast having an open slot and an opening communicating with the open slot and the openings in the base, a guide pulley mounted below the base, guide pulleys mounted in the open slot, a cap secured to the top of the mast including spaced apart members and a trunnion, guide pulleys mounted between the members, a guy cable support loosely mounted on the trunnion, a guide pulley swiveled to the mast below the cap, means remote from the mast for guiding a cable to the guide pulleys on the cap, a cable passing from one of the drums around the guide pulleys, and through the openings, a support remote from the car on which the cable is secured, a carriage on the cable, and cables extending from the carriage to the remaining drums of the hoisting engine whereby to operate said carriage to raise and lower logs.

9. In combination, a stationary base, a track thereon, a rotatable plate above the base, a lug on the latter plate, a flange secured to the stationary base and overlapping the rotatable plate to hold the latter in relation to the said base, anti-friction rollers between the plate and base, said base and said plate having openings, a guide pulley mounted under the base, a base ring to receive a mast, means for pivoting the base ring to the rotating plate, a detachable flange on the plate to engage the lug to hold the base ring in vertical position, a mast mounted in the base ring, said mast having an open slot and an opening which communicates with the open slot and the openings in the plate and base, a cap on the mast, and means coöperating with the openings and the guide pulley for guiding a cable to the top of the mast.

10. In combination, a frame, a rotating base mounted on the frame including a hinged section and means for locking the hinged section in position, a mast mounted on the rotating base, said mast having an opening in its lower end and a communicating slot, a pulley mounted below the rotating base, pulleys mounted on the mast, guide pulleys mounted near the top of the mast, a support remote from the mast, a swiveled pulley mounted on the support, a cable passing through the opening in the mast and around the pulleys, means securing the free end of the cable, means for tightening the cable, a carriage mounted on the cable, and means on the frame and mast for controlling the movement of the carriage on the cable.

11. In combination, a revolving base, a mast mounted on the revolving base, said mast having an opening at its lower end, a cap on top of the mast, a series of pulleys mounted in the cap, pulleys, one of which is swiveled at a point remote from the mast, a cable passing through the opening in the mast and around the pulleys, means securing the free end of the cable, means for adjusting the cable, a swiveled guy cable support loosely mounted on the cap, and means attached to the guy cable holder for bracing the mast.

12. In combination, a rotatable mast, a bearing supporting the bottom of the mast, a journal extending from the top of the mast, a stationary guy support mounted on the trunnion, guys secured to the guy support and rigidly fastened at their lower ends, a guide pulley near the top of the mast, a guide pulley near the bottom of the mast, a drum, an engine for operating the drum, a main cable extending from the drum and over the two pulleys, means remote from the mast for securing the outer end of the main cable, a carriage mounted to travel on the main cable, a receding cable attached to the carriage, a pulley adjacent the means for securing the outer end of the main cable and around which the receding cable passes, a guide pulley on the mast around which the receding cable passes, a drum operated by the engine to reverse the receding cable, a pulley on the carriage, two hauling cable drums operated by the engine, a hauling cable extending from the two hauling drums and around the guide pulley on the carriage, pulleys on the mast for guiding the hauling cable, a swiveled pulley on the carriage, and a hoisting cable connected to the hauling cable and passing over the swiveled pulley.

13. In combination, a mast, a car on which the mast is mounted to rotate, a guy support mounted at the top of the mast and forming a bearing for the latter, guys for holding the guy support in fixed position, a main drum, a main cable guide pulley on the mast, a main cable extending from the main drum and over the main cable guide pulley, means for fastening the outer end of the main cable to a support remote from the mast, a carriage mounted on the main cable, a receding cable attached to the carriage, a receding cable drum, a receding cable extending from the drum to the carriage, guide pulleys over which the receding cable passes, cables for operating the carriage in the opposite direction and for hoisting a load, a hoisting drum to receive one of said latter cables, an engine for operating the drums, and means operating to brace the mast in opposition to the pull of the main cable.

14. In combination, a mast, means for rotatably mounting the mast, a guy support at the upper portion of the mast, guys securing the guy support, a main cable pulley near the top of the mast, a main cable pulley near the bottom of the mast, a main cable drum, a main cable passing from the drum and over the main cable pulleys, means for securing the free end of the main cable at a point remote from the mast, means for bracing the mast in opposition to the pull of the main cable including a connection to automatically adjust the bracing, a carriage mounted on the main cable, a receding cable attached to the carriage, a drum to receive the receding cable, a guide pulley remote from the mast over which the receding cable passes, a similar guide pulley mounted on the mast over which said receding cable passes, a hauling cable, a guide on the carriage around which the hauling cable passes, guide pulleys on the mast over which the hauling cable passes, two drums for receiving the opposite ends of the hauling cable, a hoisting cable attached to the hauling cable, a guide on the carriage over which the hoisting cable passes, and an engine for operating the drums.

15. In combination, a mast, a bearing at the bottom of the mast in which the latter rotates, a guy support at the top of the mast and in which the latter rotates, guys for bracing the guy support, a combined main and brace cable, means remote from the mast to secure the outer end of the combined main and brace cable, guide pulleys near the top and bottom of the mast over which the said cable passes, a guide pulley located at a point remote from the mast and between the two aforesaid pulleys, a drum on which the inner end of the said cable is wound, a carriage mounted to travel on the main cable, means including cables and drums for moving the carriage on the cable, a hoisting cable, a guide on the carriage over which the hoisting cable passes, and an engine for operating the drums.

16. In combination, a car, a stationary base on the car, said base having an opening, a rotating plate supported on the base, a mast mounted on the rotating plate, a trunnion on the upper end of the mast, a guy support on the trunnion, guys for securing the guy support, the lower ends of the guys being secured remote from the car, the guy support and base serving as bearings for the mast, a main cable guide pulley near the top of the mast, a main cable guide pulley near the bottom of the mast, a main cable drum, a main cable on the drum, said main cable passing around the lower main cable pulley and through the opening in the mast and around the upper main cable pulley, means remote from the car to support the outer end of the main cable, means extending to a point remote from the car for bracing the mast in opposition to the pull of the main cable, a carriage mounted to travel on the main cable, receding, hauling, and hoisting cables operating on the carriage, drums located adjacent the main cable drum for operating the hauling, receding, and hoisting cables, guide pulleys on the mast for guiding said latter cables to the drums, and an engine for operating the drums.

17. In combination, a car, a mast rotatively mounted on the car, a bearing at the top of the mast, guys for supporting the upper bearing, means for anchoring the guys at points remote from the car, pivotal means for laterally tilting the mast, said pivotal means being located above the rotative mounting, a main cable guide pulley near the upper end of the mast, a main cable guide pulley at the bottom of the mast, a drum, a main cable extending from the drum and around the two pulleys, means for anchoring the free end of the main cable, means for bracing the mast in opposition to the pull of the main cable, a carriage mounted to travel on the main cable, receding and hauling cables on the carriage, a hoisting cable attached to one of the latter cables, a guide on the carriage over which the hoisting cable passes, drums for receiving the hauling and receding cables, guide pulleys on the mast over which the hauling and receding cables pass, and an engine for operating the drums.

18. In combination, a mast, means for rotatively mounting the mast, a guide pulley near the top of the mast, a guide pulley at the bottom of the mast, a drum, a pulley located at a point remote from the mast, a main cable extending from the drum and around the pulleys and anchored at its free end at a point remote from the mast, said main cable extending from the opposite side of the mast from where the remote pulley is located, the portion of the main cable extending to and from the pulley located at the point remote from the mast serving to brace the mast in opposition to the pull of the main cable between the mast and its anchored end when hauling a load, a carriage mounted to travel on the main cable, hauling, hoisting, and receding cables on the carriage, pulleys on the mast for guiding the last mentioned cables, drums to receive said cables, and an engine to operate the drums.

19. In combination, a mast, means including stationary bearings at the bottom and top of the mast, in which the latter may rotate, guys for bracing the mast, a cable track extending out from the mast, means for securing the cable track at a point remote from the mast, a remote guide, a carriage on the cable track, means including cables and drums for operating the carriage on the cable track, the main cable extending from the mast in the opposite direction to that of the portion of said cable used as a cable track and extending over the remote guide to brace said mast against the load strain when carrying a load, a drum adjacent the mast for adjusting the cable during operation of hauling a load and holding the same taut, and an engine for operating the drums.

20. In combination, a mast, means for rotatively mounting the mast, stationary guys for bracing the mast at its upper end, a guide pulley at the top of the mast, a cable track passing over the guide pulley, means for anchoring the cable track at a point remote from the mast, a drum around which the inner end of the cable track is wound, guides over which the cable track passes located between the drum and the guide pulley at the top of the mast, said guides being arranged to cause the cable track to pull the upper portion of the mast in opposition to the pull exerted on the cable track on the opposite side of the mast when strain of a load is applied, a carriage mounted to travel on the cable track, operating cables attached to the carriage to move same toward and from the mast, guides on the mast over which the operating cables pass, a hoisting cable attached to one of the operating cables, a guide on the carriage over which the hoisting cable passes, drums around which the operating cables are wound, and an engine for operating all the drums.

21. In combination, a mast, and a single cable extending therefrom, means including pulleys and a drum for simultaneously tightening the single cable and bracing the mast in opposition to the strain on the cable when hauling a load, means for rotatively mounting the mast, a carriage mounted to travel on the cable track, operating cables for the carriage, drums for the operating cables, and an engine for operating all the drums.

22. In a transporting apparatus, the combination of a mast, a single cable supported at a point remote from the mast and extending therefrom to a point beyond the mast, guides beyond and on the same side of the mast around which the single cable passes, a stationary support for one of said guides, means adjacent the bottom of the mast for receiving the end of the cable to regulate the tension of the same, that portion of the cable beyond the mast acting as a brace which will automatically brace the mast in opposition to the pull on the mast when a load is applied to the cable, a carriage mounted to travel on the cable between the mast and the point of securing said cable, and means for operating the cable.

23. In a transporting apparatus, the combination of a mast, a drum adjacent the bottom of the mast, a pulley near the top of the mast, a guide in the top of the mast, a pulley located at a point remote from the mast, a cable extending from the drum and around the pulleys and guide and fastened at a point remote from the mast, a part of the cable between the drum and the pulley near the top of the mast being substantially parallel with the mast to exert a downward pull on the mast when a load is carried on the cable, a carriage mounted to travel on the cable track between the mast and the point of securing the cable, and means for operating the carriage.

24. In a transporting apparatus, the combination of a mast, a cable extending from the mast and secured at a point remote from said mast, a guide on the mast around which the cable passes, a drum adjacent the mast to receive the end of the cable, whereby the cable may be stored or fed out to the securing point, and guides on the opposite side of the mast from which the cable extends, said cable passing around said guides for bracing the mast in opposition to the strain when hauling a load, a carriage on the cable, and means for operating the carriage.

25. In a transporting apparatus, the combination of a mast, a single cable which extends from the mast to a point remote therefrom, a carriage on the cable, and means for operating the single cable for simultaneously tightening the said cable and bracing the mast in opposition to the strain of a load supported by the carriage.

In testimony whereof I have signed my name to this specification in the presence of two subscribing witnesses.

FREDERICK W. VIERING.

Witnesses:

GEO. L. ROSE,

R. W. SNAVELY.

Copies of this patent may be obtained for five cents each, by addressing the "Commissioner of Patents, Washington, D. C."